Patented Jan. 10, 1950

2,494,253

UNITED STATES PATENT OFFICE 2,494,253

HYDROPHENANTHRENE COMPOUNDS AND PROCESS OF MAKING SAME

Karl Miescher, Riehen, and Jules Heer, Basel, Switzerland, assignors to Ciba Pharmaceutical Products, Inc., Summit, N. J.

No Drawing. Application September 11, 1947, Serial No. 773,493. In Switzerland November 22, 1946

6 Claims. (Cl. 260—599)

It is known that hydrophenanthrene-2-carboxylic acids and derivatives thereof having hydrocarbon radicals in the 1- and 2-positions are highly active estrogenic compounds.

The present invention is based on the observation that hydrophenanthryl-(2)-methanals and hydrophenanthryl-(2)-methanols, which contain hydrocarbon radicals in the 1- and 2-positions, also possess good estrogenic activity. This observation is unexpected because the corresponding hydrophenanthrene compounds which contain in the 2-position, instead of the carboxyl group, an acetyl residue, for example, are almost physiologically inactive. Thus, the threshold value of 7-methoxy-2-methyl-1-ethyl-1:2:3:4-tetrahydrophenanthryl-(2)-methanal and -(2)-methanol when administered per os or subcutaneously to castrated rats is 0.3–0.5γ, whereas 7-methoxy-2-methyl-1-ethyl-2-acetyl-1:2:3:4-tetrahydrophenanthrene is still inactive at a value of 900γ.

According to this invention, the new hydrophenanthrene derivatives are made by converting a hydrophenanthrene-2-carboxylic acid which contains hydrocarbon radicals in the 1- and 2-positions, or a functional derivative of such acid, by means of a reducing agent into a hydrophenanthryl-(2)-methanal or hydrophenanthryl-(2)-methanol, and, if desired, converting either of the latter compounds into a functional derivative.

The starting materials may contain further substituents. There may be used, more especially, compounds which contain in the 7-position a phenolic hydroxyl group or a substituent convertible, for example, by hydrolysis, into a phenolic hydroxyl group, such as an esterified or etherified hydroxyl group. As functional derivatives of the carboxylic acids there may be used, for example, the acid chlorides, thiolic esters, anhydrides, imino-halides, imino-ethers, diarylamidines, esters or the like. As starting materials the following acids or functional derivatives thereof are especially suitable: 7-hydroxy-, 7-acyloxy- or 7-alkoxy-1:2-dialkyl-1:2:3:4-tetrahydro- or -1:2:3:4:9:10-hexahydro- or -1:2:3:4:9:10:11:12-octahydro-phenanthrene-2-carboxylic acids, such as 7-methoxy-2-methyl-1-ethyl-1:2:3:4-tetrahydrophenanthrene-2-carboxylic acid, 7-methoxy-2-methyl-1-ethyl-1:2:3:4:9:10-hexahydrophenanthrene- or 7-methoxy-1:2-dimethyl-1:2:3:4:9:10-hexahydrophenanthrene-2-carboxylic acid, 7-methoxy-2-methyl-1-ethyl-1:2:3:4:9:10:11:12-octahydrophenanthrene-2-carboxylic acid, 7-hydroxy-1:2-dimethyl-1:2:3:4-tetrahydrophenanthrene-2-carboxylic acid, 7-acetoxy-2-methyl-1-ethyl-1:2:3:4-tetrahydrophenanthrene-2-carboxylic acid, 7-benzoyloxy-1:1:2-trimethyl-1:2:3:4-tetrahydrophenanthrene-2-carboxylic acid, 7-methoxy-1:2-dimethyl-1-ethyl-1:2:3:4-tetrahydrophenanthrene-2-carboxylic acid, 2-methyl-1-ethyl-1:2:3:4-tetrahydrophenanthrene-2-carboxylic acid or functional derivatives of these acids.

Most of the starting compounds are known. Insofar as this is not the case, they may be prepared by known methods [compare K. Miescher and coworkers, Helv. 27, 1727 (1944); 28, 156, 991, 1342, 1506 (1945); 29, 586, 1071, 1231, 1889 (1946); Exper. 2, 409 (1946)].

The reduction in the process of the invention may be carried out, more especially, by means of catalytically activated or nascent hydrogen. Thus, for example, the acid chlorides may be reduced to the methanals by means of hydrogen in the presence of suitable heavy metal catalysts such as palladium-barium-sulfate, palladium-charcoal and the like. Furthermore, the corresponding methanols can be obtained directly by this reaction depending on the conditions used, for example, by prolonging the period of reaction and/or increasing the reaction temperature. Again, the thiolic esters, for example, may be converted into the methanals or methanols by means of catalysts charged with hydrogen such, for example, as Raney nickel. Thus, for example, reduction with the aid of Raney nickel in aqueous alcohol yields methanals. If, on the other hand, the reduction is conducted in absolute alcohol the methanols are obtained as end products. In order to produce the methanols the methanals may subsequently be further reduced by means of catalytically activated or nascent hydrogen. Methanols, for example, may also be obtained by reacting a carboxylic acid derivative, such as an ester, an acid halide or an acid anhydride with a hydride of a light metal or a light metal alloy, such as lithium aluminium hydride.

The aldehydes so obtained may, if desired, be converted into their functional derivatives, such as acetals, or thioacetals. When the compounds obtained contain substituents convertible into phenolic hydroxyl groups these substituents may be so converted. Thus, an esterified or etherified phenolic hydroxyl group may be hydrolysed. Compounds containing free alcoholic or phenolic hydroxyl groups may be treated with esterifying or etherifying agents. Thus, for example, alkyl ethers, such as methyl, ethyl, propyl or butyl ethers, or esters of aliphatic or aromatic acids, for instance, acetic acid, propionic acid or benzoic acid, may be obtained.

The products of the invention find application as medicaments or as intermediate products.

The invention is illustrated in the following examples, in which the parts are by weight unless otherwise stated and the relationship of parts by weight to parts by volume is the same as that of the gram to the cubic centimetre:

*Example 1*

1 part of n-7-methoxy-2-methyl-1-ethyl-1:2:3:4-tetrahydrophenanthrene-2-carboxylic acid is converted by means of oxalyl chloride into the acid chloride melting at 143–144° C. The latter is dissolved in 15 parts by volume of xylene and, after the addition of 0.5 part of palladium-animal charcoal, dry hydrogen is introduced at 90–100° C. until hydrogen chloride is no longer split off. The reaction solution is then filtered, and the filtrate is evaporated under reduced pressure. The aldehyde is isolated from the residue by means of N-chloro-trimethylammonium acetic acid hydrazide. In this manner n-7-methoxy-2-methyl-1-ethyl-1:2:3:4-tetrahydrophenan-thryl-(2)-methanal of the formula

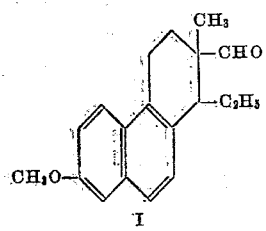

I is obtained. After recrystallisation from dilute acetone it melts at 92–93° C.

A small amount of the above reaction mixture does not react with the aldehyde reagents. This product melts at 56–60° C. and is the n-7-methoxy-2-methyl-1-ethyl-1:2:3:4-tetrahydrophenanthryl-(2)-methanol.

In an analogous manner iso-7-methoxy-2-methyl-1-ethyl-1:2:3:4-tetrahydrophenanthryl-(2)-methanal melting at 105–107° C. is obtained from iso-7-methoxy-2-methyl-1-ethyl-1:2:3:4-tetrahydrophenanthrene-2-carboxylic acid.

From these aldehydes there may be prepared their functionally converted derivatives, such as the acetals or thioacetals, for example, of the Formulae II and III

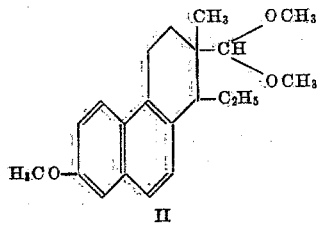

II and

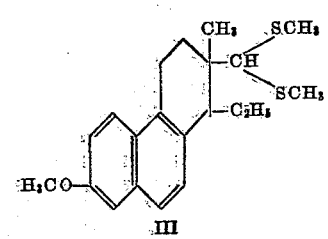

III

*Example 2*

1 part of d-7-methoxy-2-methyl-1-ethyl-1:2:3:4:9:10:11:12-octahydrophenanthrene-2-carboxylic acid is converted into the acid chloride by means of oxalyl chloride. The acid chloride is dissolved in 10 parts by volume of toluene, and, after the addition of 0.5 part of palladium-animal charcoal, dry hydrogen is introduced at 100–110° C. until hydrogen chloride is no longer split off. The reaction solution is then filtered, and the filtrate evaporated under reduced pressure. The solid residue is recrystallized from dilute methanol, and the resulting d-7-methoxy-2-methyl-1-ethyl-1:2:3:4:9:10:11:12-octahydrophenanthryl-(2)-methanal of Formula IV melts at 85–86° C.

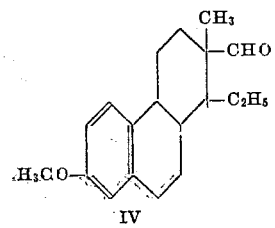

IV

It has the specific rotation $[\alpha]_D^{23°} = +104°$.

In an analogous manner the 7-methoxy-2-methyl-1-ethyl-1:2:3:4:9:10-hexahydrophenanthryl-(2)-methanal is obtained.

*Example 3*

0.3 part of n-7-methoxy-2-methyl-1-ethyl-1:2:3:4-tetrahydrophenanthrene-2-carboxylic acid methyl thiolic ester of the Formula V

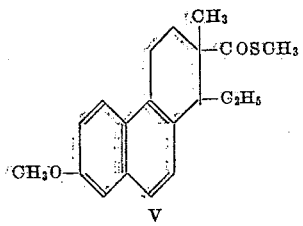

V (obtained from the acid chloride described in Example 1 with the aid of methyl mercaptan and pyridine) is heated in 10 parts by volume of aqueous alcohol in the presence of 1.5 parts of Raney nickel. The whole is filtered after a short time to remove the catalyst, the filtrate is poured into water, and taken up in ether. After being washed and dried, the ethereal solution is evaporated, and the aldehyde is isolated from the residue by means of N-chloro-trimethyl-ammonium-acetic acid hydrazide. n-7-methoxy-2-methyl-1-ethyl-1:2:3:4-tetrahydrophenanthryl-(2)-methanal is obtained by recrystallization from dilute methanol in the form of platelets melting at 92–93° C.

As a by-product n-7-methoxy-2-methyl-1-ethyl-1:2:3:4-tetrahydrophenanthryl-(2)-methanol is obtained melting at 56–60° C. and having the Formula VI

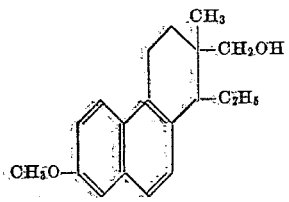

VI

*Example 4*

0.3 part of n-7-methoxy-2-methyl-1-ethyl-1:2:3:4-tetrahydrophenanthryl-(2)-methanal is hydrogenated in the presence of a platinum catalyst. The hydrogenation is finished when 1 mol of hydrogen has been absorbed. The whole is filtered, and the filtrate is evaporated under reduced pressure. The residue is recrystallized from dilute methanol, and, after prolonged drying, melts at 101-103° C. It is n-7-methoxy-2-methyl - 1 - ethyl - 1:2:3:4 - tetrahydrophenanthryl-(2)-methanol of the Formula VIIa. The acetate (of Formula VIIb) obtained therefrom melts at 81.5-82.5° C.

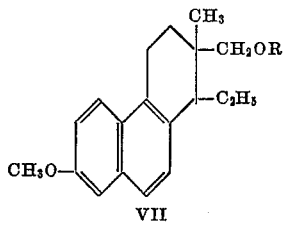

VII
VIIa: R=H
VIIb: R=CH₂CO

In an analogous manner iso-7-methoxy-2-methyl - 1 - ethyl - 1:2:3:4 - tetrahydrophenanthryl-(2)-methanol is obtained in an oily form from iso-7-methoxy-2-methyl-1-ethyl - 1:2:3:4-tetrahydrophenanthryl-(2)-methanal. The acetate of the former compound melts at 85-86° C.

*Example 5*

1.3 parts of d-7-methoxy-2-methyl-1-ethyl-1:2:3:4:9:10:11:12 - octahydrophenanthryl-(2)-methanal in 20 parts by volume of methyl alcohol are agitated under hydrogen in the presence of 0.2 part of platinum oxide. After the absorption of 1 mol of hydrogen the hydrogenation ceases. The reaction solution is then filtered and evaporated, and the residue is recrystallized from pentane. The d-7-methoxy-2-methyl-1-ethyl-octahydrophenanthryl-(2)-methanol is obtained in the form of dense crystals melting at 71° C. It has the specific rotation $[\alpha]_D^{22°} = +92°$.

*Example 6*

0.3 part of n-7-methoxy-2-methyl-1-ethyl-1:2:3:4-tetrahydrophenanthrene - 2 - carboxylic acid methyl thiolic ester is boiled in 12 parts by volume of absolute alcohol for 6 hours in the presence of 3.5 parts of Raney nickel. The whole is filtered, the filtrate is evaporated, the residue is recrystallized from dilute methanol, and n-7-methoxy - 2 - methyl - 1 - ethyl - 1:2:3:4 - tetrahydrophenanthryl-(2)-methanol is obtained in the form of lustrous platelets melting at 56-60° C., which after prolonged drying under greatly reduced pressure melt at 100-103° C.

The starting materials may contain in 7-position instead of a methoxy group on other etherified hydroxy group, for example, another alkoxy group, such as an ethoxy or propoxy group, an esterified hydroxy group, such as an acetoxy, propionyloxy or benzoyloxy group or a free hydroxy group.

According to the procedure described in Examples 1-6, for example, the following hydrophenanthryl-(2)-methanals and -methanols can be prepared:

7 - acetoxy-1,2-diallyl-1:2:3:4 - tetrahydrophenanthryl-(2)-methanal and -methanol.

7 - ethoxy-2-methyl-1-ethyl-1:2:3:4:9:10-hexahydrophenanthryl-(2)-methanal and -methanol.

7-hydroxy-2-methyl-1-ethyl-1:2:3:4:9:10:11:12-octahydrophenanthryl - (2) - methanal and -methanol.

7-methoxy-2-benzyl-1-n-propyl - 1:2:3:4 - tetrahydrophenanthryl-(2)-methanal and -methanol.

What we claim is:

1. A hydrophenanthrene compound which contains in 2-position a member of the group consisting of CHO, CH₂OH, acetal, thioacetal and CH₂O.acyl groups, and in the 1- and 2-positions hydrocarbon radicals.

2. A hydrophenanthrene compound which contains in 2-position a member of the group consisting of CHO, CH₂OH, acetal, thioacetal and CH₂O.acyl groups, and in the 1- and 2-positions hydrocarbon radicals and in 7-position a member of the group consisting of a hydroxyl group and a substituent which on hydrolysis is converted into a hydroxyl group.

3. A 1.2-dialkyl-hydrophenanthrene compound which contains in 2-position a member of the group consisting of CHO, CH₂OH, acetal, thioacetal and CH₂O.acyl groups, and in 7-position an alkoxy group.

4. The 7-methoxy-2-methyl-1-ethyl-1:2:3:4-tetrahydrophenanthryl - (2) - methanal of the formula

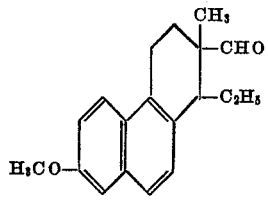

and melting at about 92-93° C.

5. The 7 - methoxy - 2 - methyl - 1 - ethyl-1:2:3:4:9:10:11:12 - octahydrophenanthryl-(2)-methanal of the formula

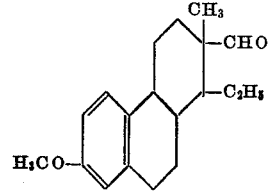

and melting at about 85-86° C.

6. The 7-methoxy-2-methyl-1-ethyl-1:2:3:4-tetrahydrophenanthryl - (2) - methanol of the formula

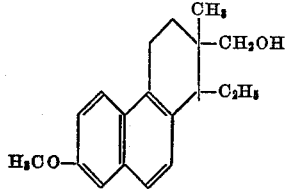

and melting at about 56-60° C.

KARL MIESCHER.
JULES HEER.

REFERENCES CITED

The following references are of record in the file of this patent:

UNITED STATES PATENTS

| Number | Name | Date |
|---|---|---|
| 2,319,976 | Campbell | May 25, 1943 |

OTHER REFERENCES

Journal Amer. Chem. Soc., vol. 55, pages 2996-2998 (1933).

Helvetica Chimica Acta, vol. 28, page 992 (1945).

Revue Canadienne de Biologie, vol. 3, No. 5, Dec. 1944, pages 522-526.